Nov. 20, 1951  E. E. MEILSTRUP  2,575,391
DETACHABLE HANDLE AND SOCKET FOR A DOLLY
Filed Aug. 2, 1948  2 SHEETS—SHEET 1
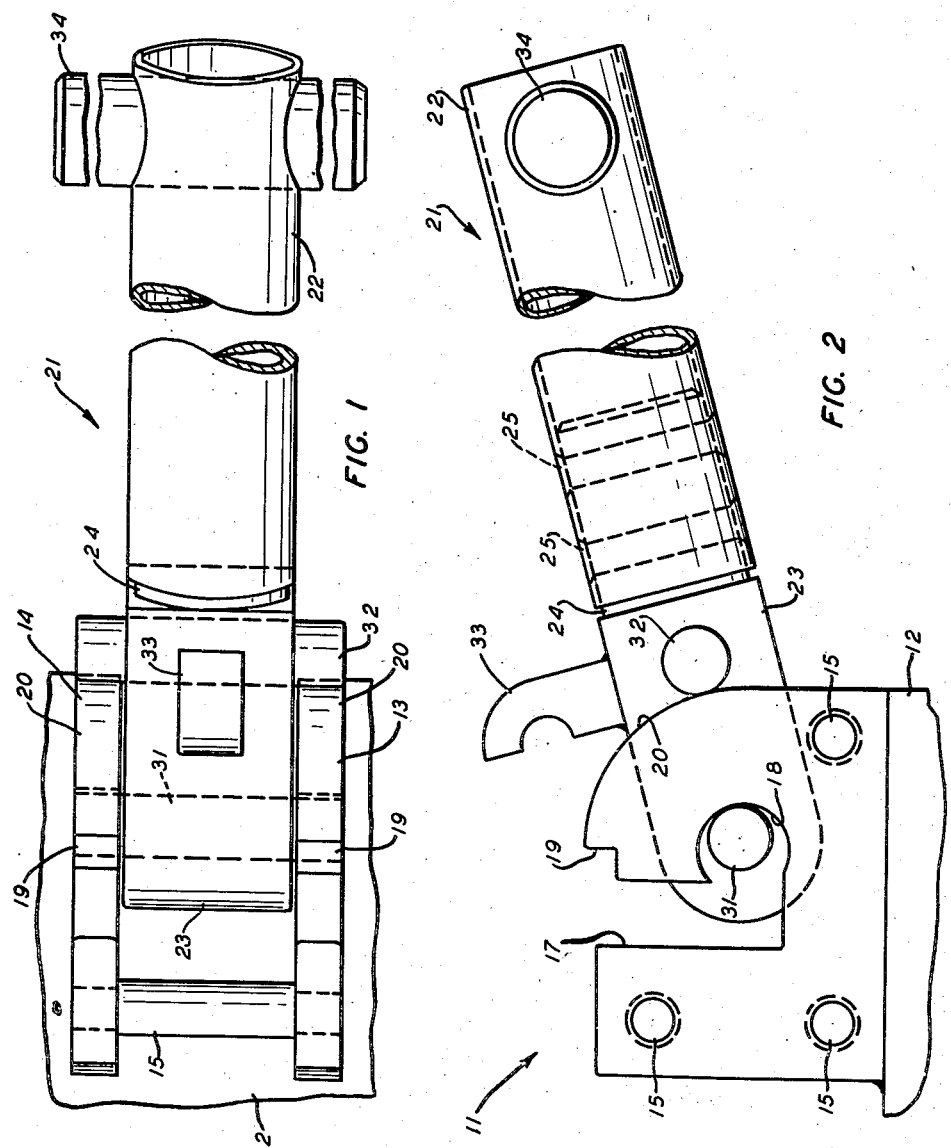
INVENTOR
E. E. MEILSTRUP
BY C.B. Hamilton
ATTORNEY Nov. 20, 1951     E. E. MEILSTRUP     2,575,391

DETACHABLE HANDLE AND SOCKET FOR A DOLLY

Filed Aug. 2, 1948     2 SHEETS—SHEET 2

INVENTOR
E. E. MEILSTRUP
BY C. B. Hamilton
ATTORNEY

Patented Nov. 20, 1951

2,575,391

UNITED STATES PATENT OFFICE 2,575,391

DETACHABLE HANDLE AND SOCKET FOR A DOLLY

Emil E. Meilstrup, Winston-Salem, N. C., assignor to Western Electric Company, Incorporated, New York, N. Y., a corporation of New York Application August 2, 1948, Serial No. 42,113

6 Claims. (Cl. 16—114)

This invention pertains to truck dollies, and more particularly to a detachable dolly handle and a cooperating socket for a dolly.

The usual construction of dollies used to transport articles in a shop comprises a flat rectangular platform mounted on a plurality of wheels. A socket member is ordinarily secured to the top front edge of the rectangular platform and a detachable handle engages in the socket. Heretofore, the usual practice has been for the operator to leave the handle of the dolly rest on the floor when not in use, which sometimes causes accidents. Also, in removable handle constructions it has been found that when the operator maneuvers the dolly rearwardly, the handle sometimes slips out of the socket member thereby causing injury to the operator.

An object of the present invention is to provide a new and improved detachable dolly handle and a cooperating dolly socket whereby the handle cannot be removed accidentally and it can be locked in an out of the way rest position off the floor.

With the above and other objects in view, the invention may be embodied in an apparatus or device comprising a detachable dolly handle which is inserted in a socket member. Located at the lower portion of the handle are a pair of spaced cross pins which fit respectively in an offset recess in the socket member and over an outside edge thereof to positively and tightly lock the handle in the socket member. This construction gives the operator safe and positive control at all times in operating the dolly. The lower portion of the handle has a hook member which is utilized in securing the handle in a non-operative position. Also one of the cross pins engages an indented shoulder in the upper portion of the socket member to lock the handle in its off the floor rest position.

A complete understanding of the invention may be obtained from the following detailed description when taken in conjunction with the accompanying drawings, in which:

Fig. 1 is a plan view of the detachable handle and the cooperating socket, showing them in operative engagement to effect the movement of a dolly;

Fig. 2 is a front elevational view of the detachable handle and its associated socket shown in Fig. 1;

Figure 3:
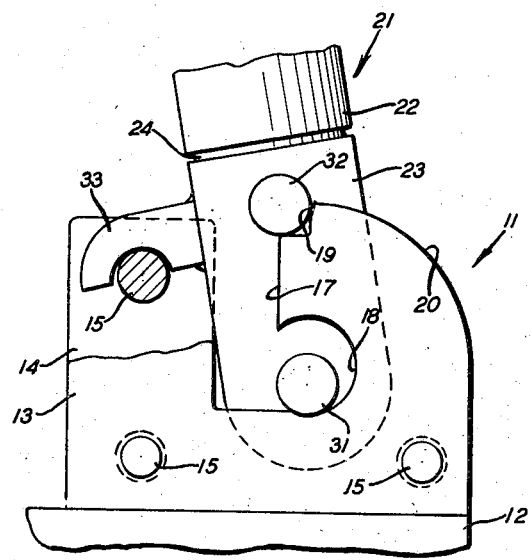
Fig. 3 is a front elevational fragmentary view of the detachable handle and its associated socket, showing the handle in its upright rest position when not in use.

Referring now to the drawings, wherein like reference numerals designate the same parts throughout the several views, a socket member 11 is secured to the front top portion of a dolly platform 12. A pair of vertical, spaced plates 13 and 14 welded to the steel frame of the dolly platform form the walls of the socket member 11 and are rigidly supported by three spaced pins 15. The ends of the pins 15 are press fitted into openings in the plates 13 and 14 and welded thereto. Vertical openings or passageways 17 (Fig. 2) are provided in the plates 13 and 14 which extend from the top edge of the plates to the lower portion thereof and have offset horizontal arcuate shaped slots or recesses 18. The slots 18 are located at right angles to the passageways 17 and a pair of offset shoulders 19 are provided near the top edges of the plates 13—14 directly above the slots 18 (Figs. 2 and 3). Adjacent the shoulders 19 are a pair of arcuate cam surfaces 20 which constitute the upper right edges of the plates 13 and 14 and are radially drawn from the center of the arcuate shaped slots 18.

Figure 4:
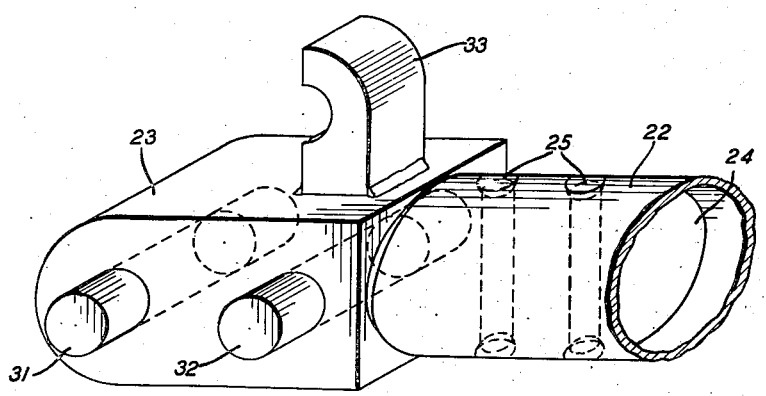
Fig. 4 is a perspective view of the lower part of the handle showing the block and interlocking pins which engage the socket on the dolly.

A detachable handle 21 comprises a steel tube 22 and a block 23. The block 23 has a projecting member 24 which fits within the lower portion of the steel tube 22 of the handle. The member 24 and tube 22 are secured together by rivets 25 as shown in Figs. 2 and 4. A pair of cross pins 31 and 32 are rigidly secured in the block 23 and protrude laterally therefrom on both sides to engage the arcuate slots 18 and arcuate surfaces 20, respectively, to rigidly hold the handle in the dolly socket. The block 23 has also welded on its upper side a protruding hook member 33 (Fig. 4) which engages the upper pin 15 (Fig. 3) when the handle 21 is in its upright rest position. At the other end of the steel tube 22 a hand gripping bar 34 is press fitted into the steel tube 22 and is utilized in manipulating the handle.

To move a dolly, the operator places the handle 21 in the socket 11 on the dolly by passing the two projecting ends of the cross pin 31 down through the vertical passageways 17. This movement is continued until the projecting portions of the pin 31 contact the bottoms of the arcuate slots 18. The handle 21 is then lifted a slight distance and rotated clockwise so that the two projecting portions of the pin 32 clear the top edge of the shoulders 19 and engages the arcuate surfaces 20 of the plates 13—14 as shown in Fig. 2. The dolly may now be moved by exerting pressure upon the hand gripping bar 34 of the handle 21.

After moving the dolly to a desired location, the operator rotates the handle 21 counterclockwise from the position shown in Fig. 2 until the hook member 33 engages the upper pin 15 to come to upright rest position thereon as shown in Fig. 3. The outer portions of the cross pins 31 and 32 are now bearing respectively on the lower portions of the slots 18 and the shoulders 19.

Because of the locking action of the pin 32 on the shoulders 19, the engagement of the hook member 33 with the pin 15, and the pin 31 bearing within the arcuate slots 18, the handle 21 is securely locked in the socket member 11 in its off the floor rest position.

Although the invention has been described with reference to a particular embodiment, it is to be understood that various modifications may be made without departing from the scope of the invention as defined by the appended claims.

What is claimed is:

1. In a handle and socket for a dolly, a socket member secured to the dolly having an arcuate slot and an arcuate surface concentric with the slot, a handle, a pair of spaced projecting pins secured in tandem on the lower portion of the handle for engagement with the said arcuate slot and arcuate surface of the socket member, one of said pins contacting the surface of the slot and another of said pins simultaneously contacting the arcuate surface to hold the handle in operative engagement with the socket, and means to secure the handle in a substantially vertical position after it has been rotated in the socket to its off the floor rest position.

2. In a handle and socket for a dolly, a socket member secured to the dolly and having side walls, each of said side walls having an arcuate outer surface and an offset shoulder and an arcuate slot concentric with the arcuate outer surface, a locking pin mounted in said socket, a handle, and a plurality of means on said handle which engage respectively the offset shoulder, the slot, and the locking pin to secure the handle in a substantially vertical position, said means on the handle which engage the offset shoulder and the slot also being movable to simultaneously contact the concentric arcuate surfaces and arcuate slots of the socket, respectively, as the handle is rotated into position to permit subsequent movement of the dolly.

3. In a handle and socket for a dolly, a socket member secured to the dolly, said socket having spaced side walls, each of the side walls of said socket member having an arcuate outer surface and an offset shoulder and a vertical passageway extending into an arcuate shaped slot cut into each of said side walls, a handle having mounted thereon a pair of spaced cross pins and a hook member, a locking pin mounted in the socket, one of said cross pins engaging the arcuate shaped slot and the other cross pin simultaneously engaging the offset shoulder when the hook member contacts the locking pin to secure the handle in a substantially vertical off the floor rest position, said cross pins being movable into engagement with said arcuate portions of the socket as the handle is rotated into position to maintain the handle in operative engagement with the socket so that pressure may be exerted on the handle to move the dolly.

4. A handle and socket for a dolly comprising a socket member secured to the dolly, said socket member having a pair of spaced wall members, each of said wall members having a slot, a plurality of bridging pins connecting the wall members, a handle adapted for angular rotation in the socket from a horizontal operative position to a substantially vertical off the floor rest position, and a plurality of means secured to said handle to engage respectively one of the bridging pins and the slots to retain the handle in its off the floor rest position.

5. In a handle and socket coupling in which the handle is angularly rotated in the socket from a vertical rest position into an engaged operative position, a socket having a stop and an arcuate slot and an arcuate outer surface concentric with said slot, a handle, a pair of socket engaging means secured to one end of the handle; said means including a first circular pin having a diameter less than the diameter of the arcuate slot and positioned therein and a second pin normally in engagement with the stop when the handle is in its rest position, whereby the handle may be angularly shifted from its rest position into operative position only after the handle is raised to clear the stop and rotated to bring the engaging means into contact with the concentric arcuate surfaces of the socket.

6. In a handle and socket coupling in which the handle is angularly rotated in the socket from a vertical rest position into an engaged operative position; a socket having an arcuate slot, an arcuate outer surface concentric with said slot, and an offset shoulder; a locking pin mounted in said socket; a handle; and socket engaging means secured to one end of the handle, said means including a bearing surface, a hook and a circular pin, said circular pin having a diameter less than the diameter of the arcuate slot whereby the handle may be secured in its rest position by a three point interlocking in which the hook, the circular pin, and the cooperative bearing surface of the handle engage the locking pin, the arcuate slot, and the offset shoulder of the socket, respectively, so that the handle may be angularly shifted from its rest position into operative position only after the handle is raised to disengage the bearing surface from the said shoulder and bring the bearing surface and circular pin into engagement with the concentric arcuate surfaces of the socket.

EMIL E. MEILSTRUP.

REFERENCES CITED

The following references are of record in the file of this patent:

UNITED STATES PATENTS

| Number | Name | Date |
|---|---|---|
| 462,112 | Coup | Oct. 27, 1891 |
| 891,235 | Diehl | June 23, 1908 |
| 980,577 | Weingardt | Jan. 3, 1911 |
| 2,368,297 | Hanke | Jan. 30, 1945 |
| 2,370,860 | Hanke | Mar. 6, 1945 |